United States Patent
Bai et al.

(10) Patent No.: US 11,522,656 B2
(45) Date of Patent: Dec. 6, 2022

(54) APPARATUS AND METHOD FOR DETERMINING RESOURCES FOR PHASE TRACKING REFERENCE SIGNAL (PT-RS) PILOT SIGNALS USING FREQUENCY DOMAIN PATTERNS

(71) Applicant: QUALCOMM Incorporated, San Diego, CA (US)

(72) Inventors: Tianyang Bai, Somerville, NJ (US); Juergen Cezanne, Ocean Township, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/089,627

(22) Filed: Nov. 4, 2020

(65) Prior Publication Data
US 2021/0050977 A1 Feb. 18, 2021

Related U.S. Application Data

(63) Continuation of application No. 16/746,585, filed on Jan. 17, 2020, now Pat. No. 11,070,335, which is a
(Continued)

(51) Int. Cl.
*H04L 5/00* (2006.01)
*H04W 72/12* (2009.01)
*H04W 72/04* (2009.01)

(52) U.S. Cl.
CPC .......... *H04L 5/0048* (2013.01); *H04W 72/04* (2013.01); *H04W 72/12* (2013.01)

(58) Field of Classification Search
CPC ..... H04W 72/04; H04L 5/0005; H04L 5/0048
See application file for complete search history.

(56) References Cited

U.S. PATENT DOCUMENTS 8,014,366 B2 9/2011 Wax et al.
8,730,883 B2 5/2014 Ohwatari et al.
(Continued)

FOREIGN PATENT DOCUMENTS

CN 102224700 A 10/2011
CN 103702432 A 4/2014
(Continued)

OTHER PUBLICATIONS

A. Kalachikov and A. Stenin, "Performance Evaluation of the SRS Based MIMO Channel Estimation on 5G NR Open Source Channel Model," 2021 IEEE 22nd International Conference of Young Professionals in Electron Devices and Materials (EDM), Jan. 2021, pp. 124-127, doi: 10.1109/EDM52169.2021.9507598. (Year: 2021).*
(Continued)

*Primary Examiner* — William D Cumming
(74) *Attorney, Agent, or Firm* — Arent Fox LLP/Qualcomm Incorporated

(57) ABSTRACT

An apparatus for wireless communication selects a recommendation for the need. The apparatus selects the resource to transmit a phase tracking reference signal based on a condition of a communication system. The apparatus performs at least one of transmitting an indication of the selected recommendation for the resource to a second wireless communication device or transmitting at least one of information or a reference signal to the second device to assist the second device in determining the resource. In an aspect, the selection may be made based on receiving a request for a recommendation from the second wireless communication device or the transmitting the at least one of the information or the reference signal are based on a request received.

36 Claims, 13 Drawing Sheets

Related U.S. Application Data continuation of application No. 15/711,157, filed on Sep. 21, 2017, now Pat. No. 10,560,243.

(60) Provisional application No. 62/446,342, filed on Jan. 13, 2017.

(56) References Cited

U.S. PATENT DOCUMENTS

| | | | |
|---|---|---|---|
| 8,817,709 | B2 | 8/2014 | Wu et al. |
| 9,294,238 | B2 | 3/2016 | Dahlman et al. |
| 9,667,458 | B1 | 5/2017 | Frank et al. |
| 9,686,112 | B2 | 6/2017 | Terry |
| 9,692,587 | B2 | 6/2017 | McKinley |
| 10,560,243 | B2 | 2/2020 | Bai et al. |
| 11,070,335 | B2 * | 7/2021 | Bai ................. H04W 72/04 |
| 11,115,160 | B2 * | 9/2021 | Shattil ................. H04J 15/00 |
| 2001/0001616 | A1 | 5/2001 | Rakib et al. |
| 2001/0024474 | A1 | 9/2001 | Rakib et al. |
| 2001/0046266 | A1 | 11/2001 | Rakib et al. |
| 2002/0015423 | A1 | 2/2002 | Rakib et al. |
| 2003/0156603 | A1 | 8/2003 | Rakib et al. |
| 2005/0047384 | A1 | 3/2005 | Wax et al. |
| 2011/0080884 | A1 | 4/2011 | Ohwatari et al. |
| 2014/0313908 | A1 | 10/2014 | Da et al. |
| 2015/0092691 | A1 | 4/2015 | Hwang et al. |
| 2015/0126207 | A1 | 5/2015 | Li et al. |
| 2016/0309347 | A1 | 10/2016 | Eyuboglu et al. |
| 2017/0141899 | A1 | 5/2017 | Lu et al. |
| 2017/0302495 | A1 | 10/2017 | Islam et al. |
| 2018/0205528 | A1 | 7/2018 | Bai et al. |
| 2018/0262311 | A1 | 9/2018 | Wang et al. |
| 2018/0279262 | A1 | 9/2018 | Babaei et al. |
| 2019/0037586 | A1 | 1/2019 | Park et al. |
| 2019/0044686 | A1 | 2/2019 | Sakamoto |
| 2019/0158252 | A1 | 5/2019 | Li et al. |
| 2019/0166625 | A1 | 5/2019 | Nam et al. |
| 2019/0215086 | A1 | 7/2019 | Kwak et al. |
| 2019/0261234 | A1 | 8/2019 | Park et al. |
| 2019/0356437 | A1 | 11/2019 | Zhong et al. |
| 2019/0373602 | A1 * | 12/2019 | Qin ................. H04L 5/0051 |
| 2020/0021413 | A1 | 1/2020 | Park et al. |
| 2020/0076557 | A1 | 3/2020 | Sun et al. |
| 2020/0153586 | A1 | 5/2020 | Bai et al. |
| 2020/0374054 | A1 * | 11/2020 | Shattil ................. H04L 5/0005 |
| 2021/0399849 | A1 * | 12/2021 | Shattil ................. H04L 5/0005 |

FOREIGN PATENT DOCUMENTS

| | | | | |
|---|---|---|---|---|
| EP | 3568939 B1 * | 10/2021 | ........... | H04L 5/0092 |
| WO | 2011046965 A1 | 4/2011 | | |
| WO | 2017200315 A1 | 11/2017 | | |
| WO | WO-2018132237 A2 * | 7/2018 | ......... | H04L 27/2601 |
| WO | WO2022150236 A1 * | 7/2022 | | |

OTHER PUBLICATIONS

C. Xu et al., "Sixty Years of Coherent Versus Non-Coherent Tradeoffs and the Road From 5G to Wireless Futures," in IEEE Access, vol. 7, pp. 178246-178299, Dec. 2019, doi: 10.1109/ACCESS.2019.2957706. (Year: 2019).*
C. Xu et al., "Sixty Years of Coherent Versus Non-Coherent Tradeoffs and the Road From 5G to Wireless Futures," in IEEE Access, vol. 7, pp. 178246-178299, 2019, doi: 10.1109/ACCESS.2019.2957706. (Year: 2019).*
Taiwan Search Report—TW106144763—TIPO—dated Nov. 4, 2020.
802.16.2: "IEEE Recommended Practice for Local and metropolitan Area Networks Coexistence of Fixed Broadband by IEEE Computer Society and the IEEE Microwave Theory and Techniques Society" Mar. 2004 (Year: 2004).
CATT: "Discussion on Phase Tracking RS for NR", 3GPP Draft; 3GPP TSG RAN WG1 Meeting #87, R1-1611382, 3rd Generation Partnership Project (3GPP), Mobile Competence Centre; 650, Route Des Lucioles; F-06921 Sophia-Antipolis Cedex; France, vol. RAN WG1, Reno, USA; Nov. 14, 2016-Nov. 18, 2016, Nov. 13, 2016 (Nov. 13, 2016), XP051175363, 3 pages, Retrieved from the Internet: URL: http://www.3gpp.org/ftp/Meetings_3GPP_SYNC/RAN1/Docs/ [retrieved on Nov. 13, 2016].
CMCC: "Phase-Tracking Reference Signal Design for High-Frequency Systems", 3GPP Draft; 3GPP TSG RAN WG1 NR Ad-Hoc Meeting, R1-1700438, 3rd Generation Partnership Project (3GPP), Mobile Competence Centre; 650, Route Des Lucioles; F-06921 Sophia-Antipolis Cedex; France, vol. RAN WG1, Spokane, USA; Jan. 9, 2017, XP051202264, 11 pages, Retrieved from the Internet: URL: http://www.3gpp.org/ftp/tsg_ran/WG1_RL1/TSGR1_AH/NR_AH_1791/Docs/ [retrieved on—Jan. 9, 2017].
Intel Corporation: "Discussion on Reference Signal for Phase Tracking", 3GPP Draft; 3GPP TSG RAN WG1 NR Ad-Hoc Meeting, R1-1700355, Discussion on Reference Signal for phase tracking R3, 3rd Generation Partnership Project (3GPP), Mobile Competence Centre; 650, Route Des Lucioles; F-06921 Sophia-Antipolis Cedex; France, Jan. 10, 2017 (Jan. 10, 2017), XP051202833, 5 pages, Retrieved from the Internet: URL: http://www.3gpp.org/ftp/tsg-ran/WG1 RL1/TSGR1_AH/NR_AH_1701/Docs/ [retrieved on—Jan. 10, 2017].
International Search Report and Written Opinion—PCT/US2017/067673—ISA/EPO—dated Jul. 16, 2018.
International Preliminary Report on Patentability—PCT/US2017/067673, The International Bureau of WIPO—Geneva, Switzerland, dated Jul. 25, 2019.
International Search Report and Written Opinion—PCT/US2017/067673—ISA/EPO—dated Mar. 28, 2018.
National Instruments: "Study of Time & Frequency Density of UE-Specific & Cell-Specific Phase Noise RS with Different CPE Estimation Techniques", 3GPP Draft; 3GPP TSG RAN WG1 NR Ad-Hoc Meeting, R1-1700854, 3rd Generation Partnership Project (3GPP), Mobile Competence Centre; 650, Route Des Lucioles; F-06921 Sophia-Antipolis Cedex; France, vol. RAN WG1, Spokane, USA; Jan. 10, 2017 (Jan. 10, 2017), XP051203163, pp. 1-12. Item 7 Continued: Retrieved from the Internet: URL: http://www.3gpp.org/ftp/tsg_ran/WG1_RL1/TSGR1_AH/NR_AH_1701/Docs/ [retrieved on—Jan. 10, 2017].
Nokia., et al., "On Reference Symbol Types in NR", 3GPP Draft, 3GPP TSG-RAN WG1#87, R1-1612854, 3rd Generation Partnership Project (3GPP), Mobile Competence Centre; 650, Route Des Lucioles; F-06921 Sophia-Antipolis Cedex; France, vol. RAN WG1, Reno, USA, Nov. 14, 2016-Nov. 18, 2016, Nov. 13, 2016 (Nov. 13, 2016), XP051176795, 4 pages, Retrieved from the Internet: URL: http://www.3gpp.org/ftp/Meetings_3GPP_SYNC/RAN1/Docs/ [retrieved on 2916-11-13].
Qualcomm Incorporated: "Phase and Frequency Tracking Reference Signal Considerations," 3GPP Draft; R1-1700808 Phase And Frequency Tracking Reference Signal Considerations, 3rd Generation Partnership Project (3GPP), Mobile Competence Centre ; 650, Route Des Lucioles ; F-06921 Sophia-Anti, vol. RAN WG1, No. Spokane, USA; Jan. 16, 2017-Jan. 20, 2017, Jan. 10, 2017 (Jan. 10, 2017), XP051203121, 7 pages, Retrieved from the Internet: URL: http://www.3gpp.org/ftp/tsg_ran/WG1_RL1/TSGR1_AH/NR_AH_1701/Docs/—[retrieved on—Jan. 10, 2017].
Xinwei: "Discussion and Evaluation of Phase Tracking RS Design", 3GPP Draft; 3GPP TSG-RAN WG1 NR Ad Hoc, R1-1700781 Discussion and Evaluation of Phase Tracking RS Design, 3rd Generation Partnership Project (3GPP), Mobile Competence Centre; 650, Route Des Lucioles; F-06921 Sophia-Antipolis Cedex; France, vol. RAN WG1, Spokane, WA; Jan. 10, 2017 (Jan. 10, 2017), XP051203996, 5 pages, Retrieved from the Internet: URL: http://www.3gpp.org/ftp/tsg_ran/WG1_RL1/TSGR1_AH/NR_AH_1701/Docs/ [retrieved on Jan. 10, 2017].
European Search Report—EP21193635—Search Authority—The Hague—dated Dec. 14, 2021.

* cited by examiner

APPARATUS AND METHOD FOR DETERMINING RESOURCES FOR PHASE TRACKING REFERENCE SIGNAL (PT-RS) PILOT SIGNALS USING FREQUENCY DOMAIN PATTERNS

CROSS-REFERENCE TO RELATED APPLICATION(S)

The present application is a continuation of U.S. application Ser. No. 16/746,585, entitled "SYSTEMS AND METHODS TO SELECT OR TRANSMITTING FREQUENCY DOMAIN PATTERNS FOR PHASE TRACKING REFERENCE SIGNALS" and filed Jan. 17, 2020, which is a continuation of U.S. application Ser. No. 15/711,157, entitled "SYSTEMS AND METHODS TO SELECT OR TRANSMITTING FREQUENCY DOMAIN PATTERNS FOR PHASE TRACKING REFERENCE SIGNALS" and filed Sep. 21, 2017, now U.S. Pat. No. 10,560,243 issued on Feb. 11, 2020, which claims priority to U.S. Provisional Patent Application No. 62/446,342, entitled "SYSTEMS AND METHODS TO SELECT OR TRANSMITTING FREQUENCY DOMAIN PATTERNS FOR PHASE TRACKING REFERENCE SIGNALS" and filed Jan. 13, 2017, assigned to the assignee hereof. The disclosures of each of the foregoing non-provisional and provisional applications are expressly incorporated by reference herein in their entireties.

BACKGROUND

Field

The present disclosure relates generally to communication systems, and more particularly, to a systems and methods for selecting frequency domain patterns for phase tracking reference signals and/or transmitting selected frequency domain patterns for phase tracking reference signals.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method of wireless communication at a first wireless communication device includes transmitting, by a first wireless communication device to a second wireless communication device, information to enable the second wireless communication device to determine a recommended frequency domain pattern for phase tracking reference signal (PT-RS) pilot signals. The method continues with receiving, by the first wireless communication device from the second wireless communication device, a configuration of the recommended frequency domain pattern. The method then includes determining, by the first wireless communication device, one or more time frequency resource locations for the PT-RS pilot signals based on a selected frequency domain pattern, wherein the selected frequency domain pattern is either the recommended frequency domain pattern or different from the recommended frequency domain pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
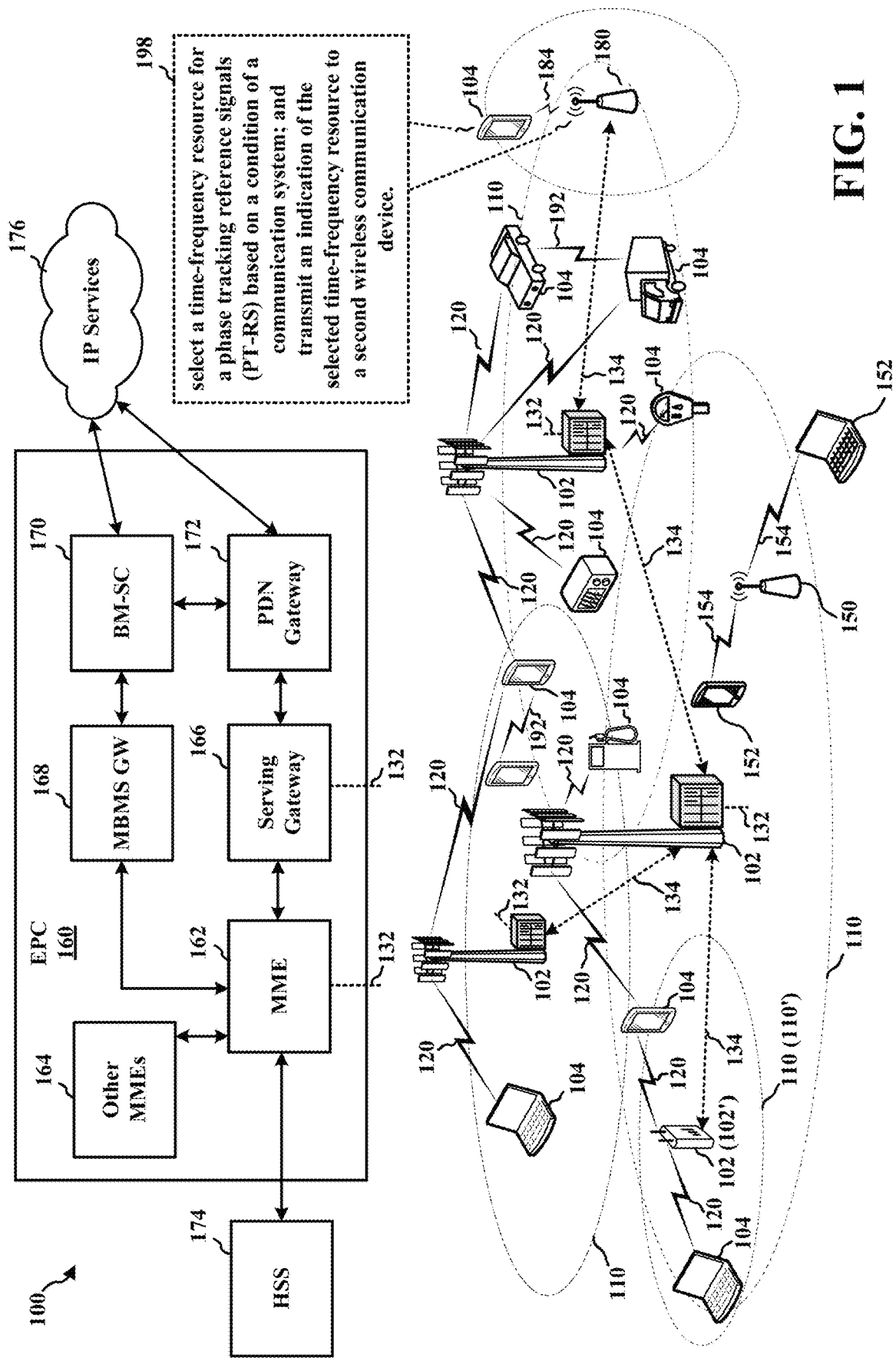
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth®, ZigBee®, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 (or gNB as discussed below) may be configured to select a time-frequency resource for a phase tracking reference signals (PT-RS) based on a condition of a communication system, and transmit an indication of the selected time-frequency resource to a second wireless communication device (198).

Figure 2:
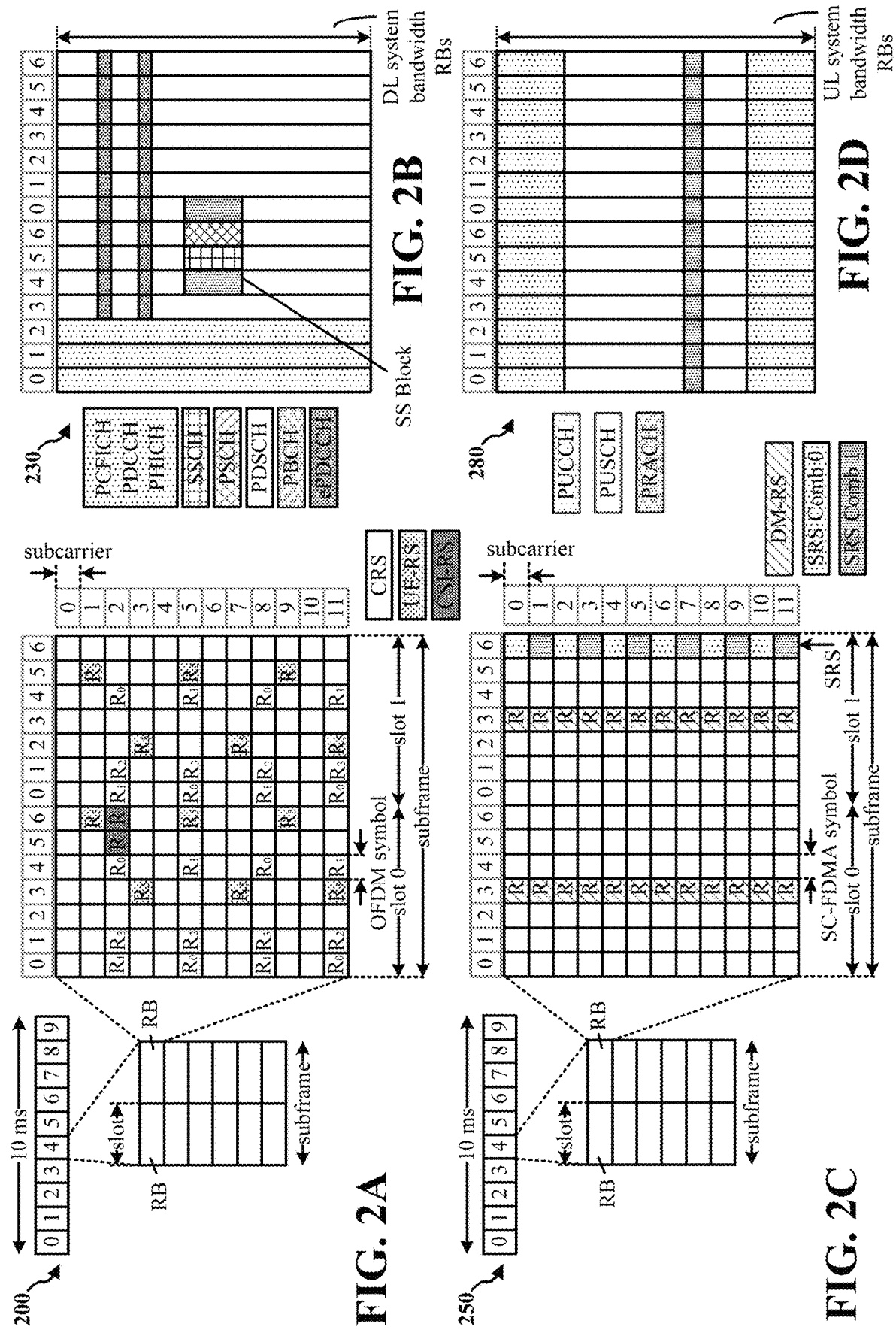
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARM) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
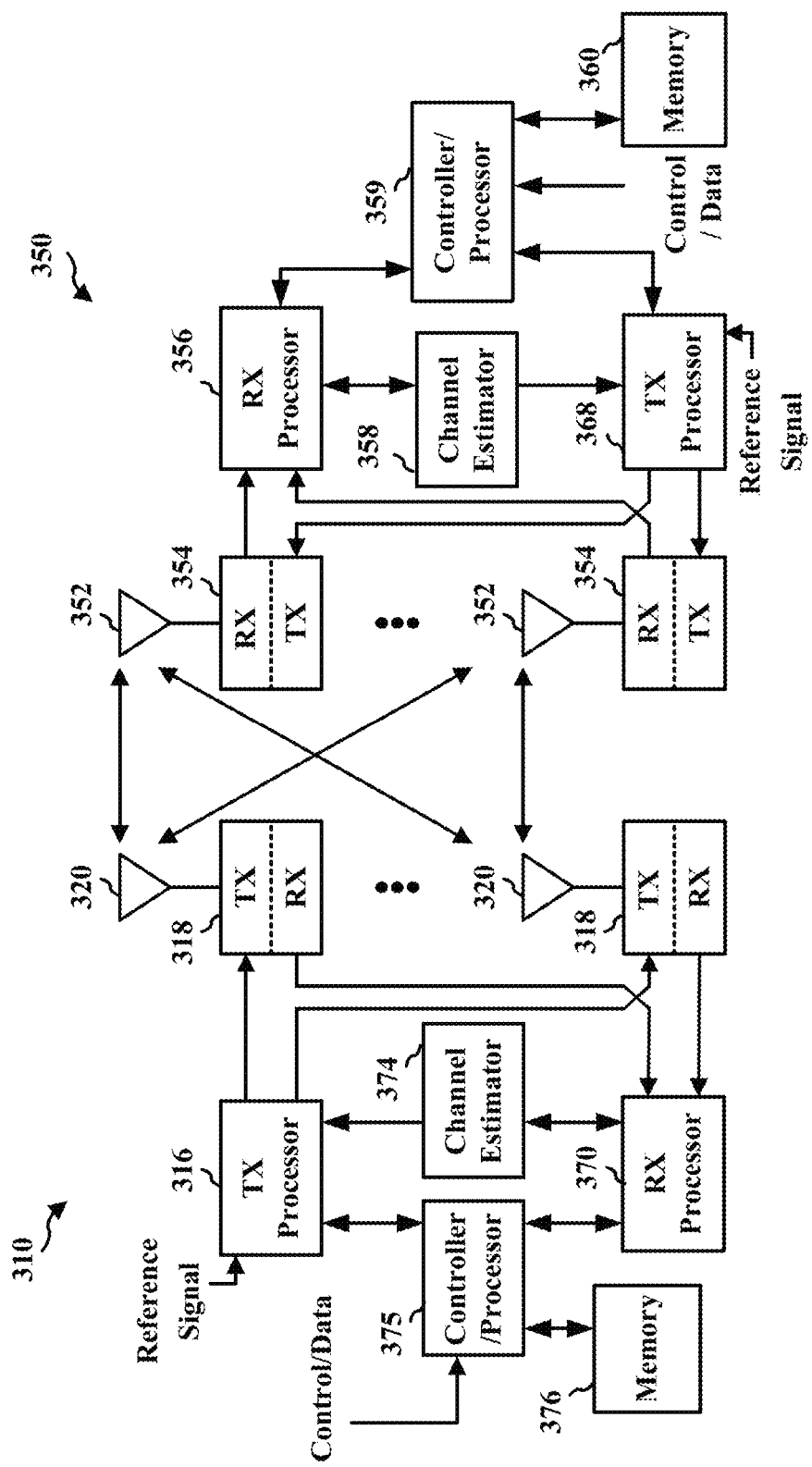
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. For example, each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream.

Alternatively, each stream may be precoded with a DFT spreading precoder, multiplexed with a reference signal (e.g., a pilot signal) in the time and/or frequency domain, and then combined together each stream using an IFFT to produce a physical channel carrying a time domain single carrier FDM (SC-FDM) symbol stream. The OFDM or SC-FDM streams can be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM/SC-FDM symbol stream. In the case of OFDM, the RX processor 356 then converts the OFDM symbol stream from the time-domain to the frequency domain using a Fast Fourier Transform (FFT). The frequency domain signal comprises a separate OFDM symbol stream for each subcarrier of the OFDM signal. In another case of SC-FDM, the RX processor 356 first converts the SC-FDM symbol stream from the time-domain to the frequency domain using a Fast Fourier Transform (FFT), and then obtains the symbol after de-spreading using a DFT matrix. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, demultiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Some examples described herein may refer to a next generation Node B (gNB). The base stations 102 and the base stations 310 and any other similar devices described with respect to FIGS. 1-3 may generally be replaced with gNBs. (The gNBs may have some differences from the base stations 310, which will be understood by those of skill in the art.

Some aspects of the systems and methods may transmit and/or receive signals over at least one of the Physical Uplink Shared Channel (PUSCH) or the Physical Downlink Shared Channel (PDSCH).

Phase errors may cause failures in detection and an increased bit error rate, which may lead to an increased number of re-transmissions, and/or a lower throughput. Phase tracking reference signals (PT-RS) may be used to track and correct phase errors in received symbols. For example, PT-RS may be used to track and correct errors in mmW systems. Phase errors may be caused by phase noise (PN), carrier frequency offset (CFO), and Doppler shift. PN is rapid random fluctuations in the phase of a waveform. PN may be caused by jitter of an oscillator in a wireless link, for example. PN may have a larger impact in millimeter wave (mmW) systems because the carrier frequency is higher and the power of PN increases as carrier frequency increases. CFO and Doppler shift may also result in the phase of a signal time-varying from symbol to symbol. Accordingly, there may be different distortions in the phase from one symbol to the next.

Figure 4:
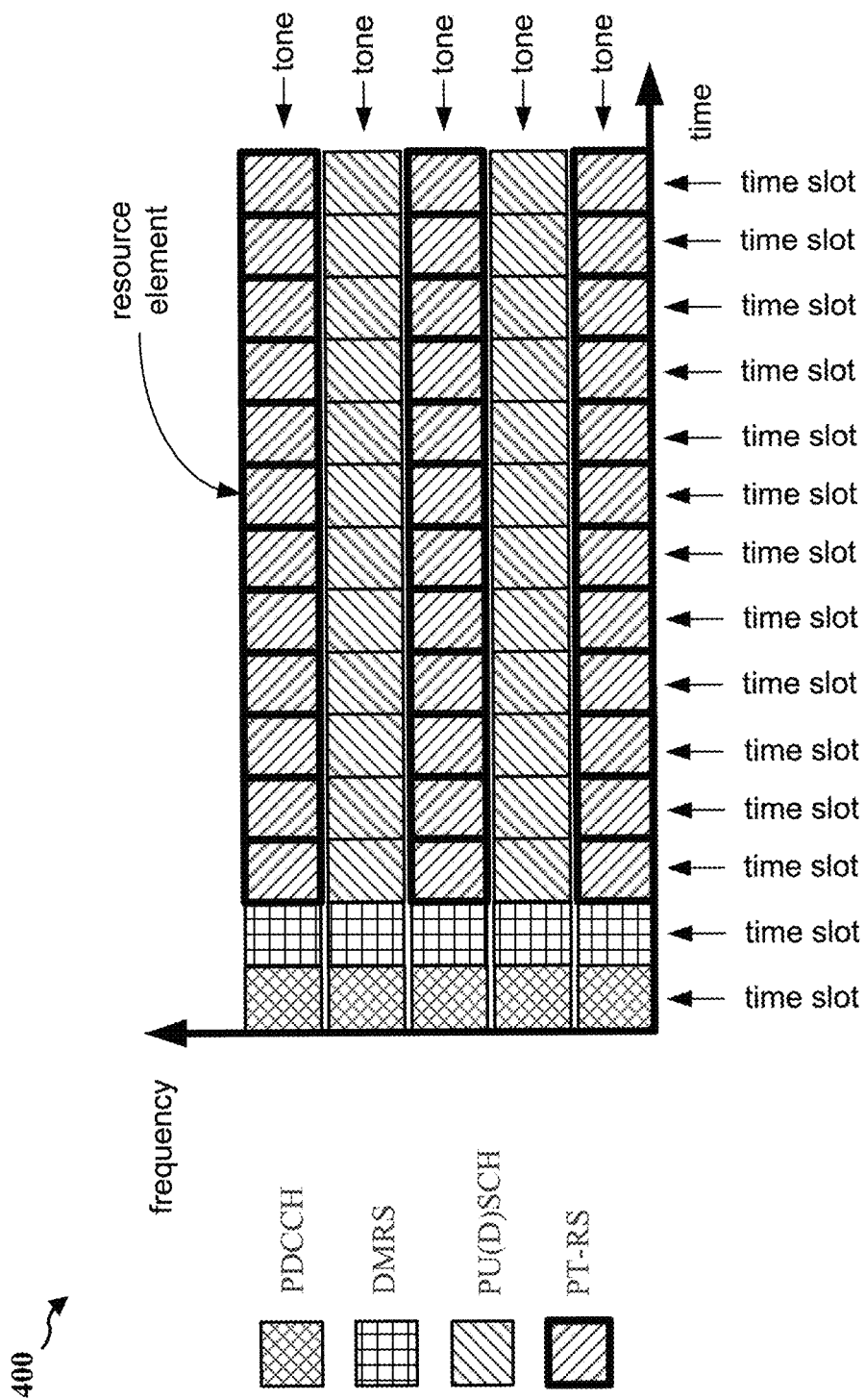
FIG. 4 is a diagram illustrating an example of an assignment of channels/signaling to time-frequency resources that may be used in a communication system.

FIG. 4 is a diagram illustrating an example of an assignment of channels/signaling to time-frequency resources that may be used in a communication system. FIG. 4 illustrates PT-RS pilot signals (also referred to as PT-RS pilot tones) for a Cyclic Prefix Orthogonal Frequency Division Multiplexing (CP-OFDM) communication system. PT-RS pilot signals may be continuous (as illustrated) or discontinuous in the time domain. For a UE, the PT-RS signals may occupy one tone or several tones, based on scheduled bandwidth, Modulation and Coding Scheme (MCS), signal-to-noise ratio (SNR), interference, PN mask (power of PN), port mapping, and/or other attributes that may impact the received signal quality of communication signals. Phase noise may be modelled as random process of noise. A PN mask may describe the PN power distribution in the frequency domain. Generally, a higher MCS implies that a higher SNR may be needed for same error rate. A higher MCS, a higher scheduled bandwidth, a higher SNR, and/or higher interference may require more PT-RS tones. A larger PN mask may require more PT-RS tones.

A higher SNR in the PT-RS pilot signals may provide a more accurate phase error estimation. Accordingly, in some aspects, the PT-RS pilot signals may be located in the tones with good channel conditions, high SNR, and/or high signal-to-interference-plus-noise ratio (SINR) which may result in more accurate phase tracking at the receiver. Increasing the number of PT-RS pilot signals may provide more accurate phase error estimation. For example, an increased number of PT-RS pilot signals may allow for thermal noise to be averaged out over the larger number of PT-RS pilot signals. Additionally, an increased number of PT-RS pilot signals may allow for frequency diversity to be exploited. For a given communication link with a given channel model and SNR/MCS/PN, an increased number of PT-RS pilot signals may lead to a performance gain, e.g., increased data rate. However, the gain from increasing the number of PT-RS pilot signals may saturate for a given number of PT-RS pilot signals in a scheduled bandwidth. Accordingly, UEs with a large scheduled bandwidth may use a more sparse PT-RS frequency domain pattern. Conversely, UEs with a small scheduled bandwidth may use a denser PT-RS frequency domain pattern. In an aspect, PT-RS frequency domain pattern selection may depend on scheduled bandwidth and channel conditions. In one example, the pattern of a PT-RS may be from a pre-defined pattern dictionary and may have a tone number for each PT-RS tone. In another example, an index of an RB/subband may use PT-RS tone locations within each RB/Subband that are predefined. An aspect may select a pattern and inform of the frequency pattern by sending a number of PT-RS tones, the tone locations, and port mapping, e.g., in which of the spatial streams the PT-RS tones are mapped.

The required number of PT-RS pilot signals to achieve certain performance requirement, e.g. a bit error rate less than 0.5%, 1%, 2%, some other bit error rate, or some other performance metric, for a given scheduled bandwidth may depend on a number of factors, such as channel conditions, UE speed, UE capability, UE processing power, UE battery charge, mobility, and other factors that may impact a communication system's performance. A communication system with too few PT-RS signals may result in more retransmissions due to channel errors, which reduce throughput. A system with too many PT-RS signals may utilize valuable system bandwidth for minimal decrease in channel error rate. Therefore, the PT-RS signal configuration may be selected based on the channel conditions and/or bandwidth. In some aspects, the UE and eNB may "negotiate" an appropriate PT-RS configuration.

Some PT-RS designs, such as the PT-RS design illustrated in FIG. 4, may use a fixed PT-RS frequency domain pattern. The density of PT-RS pilot signals may be fixed both in the number of PT-RS patterns, e.g., 1 PT-RS tone per 48 tones, 1 PT-RS tone per 96 tones and the locations of the PT-RS tones may be fixed at particular time-frequency resource "locations." For example, PT-RS pilot signals may be chosen from a pre-defined set, e.g., selected from among the 1 PT-RS tone per 48 tones and the locations of PT-RS tones may be fixed, e.g. at the 4th tone of every 48 tones. Accordingly, in some examples, the PT-RS pilot signals may be uniformly located in the frequency domain.

Figure 5:
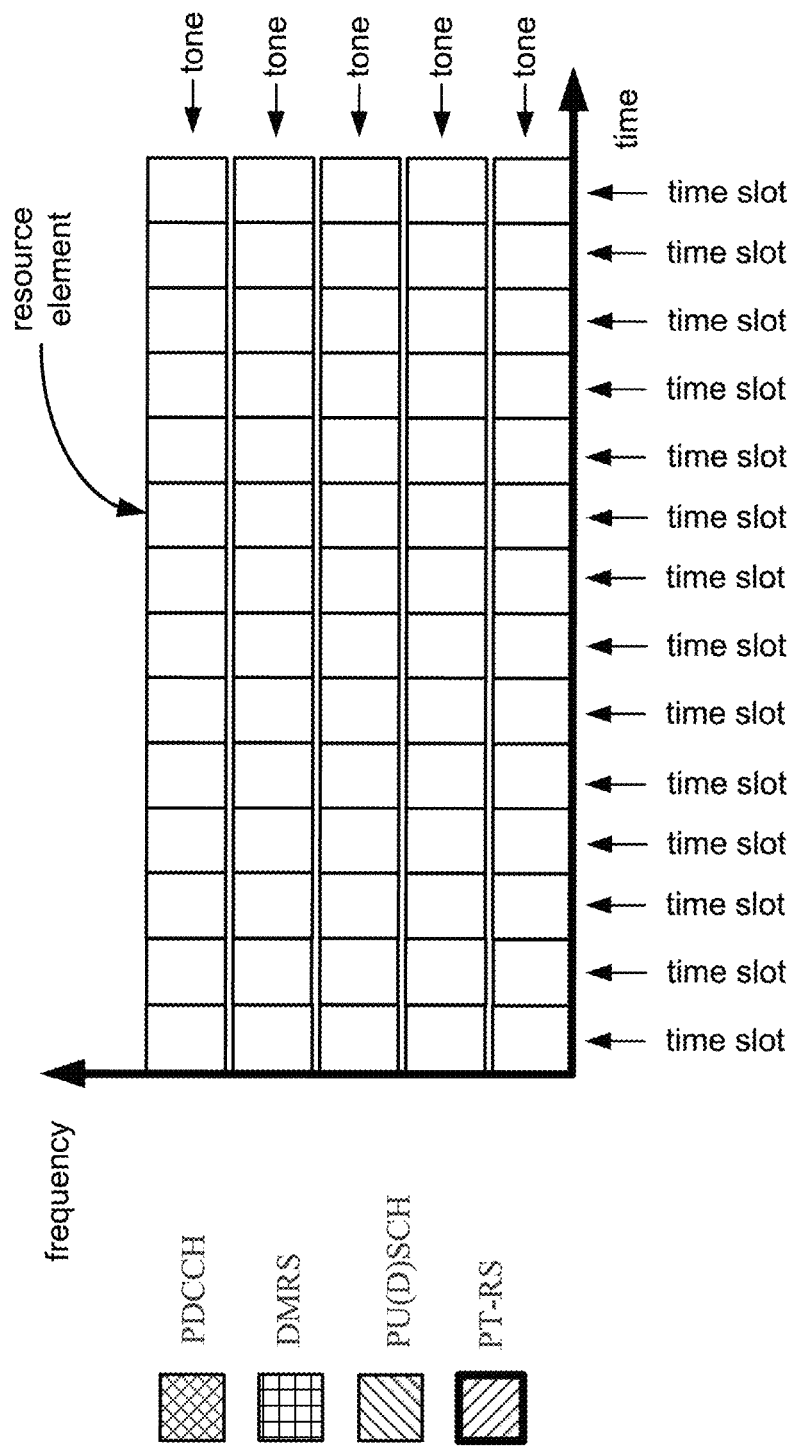
FIG. 5 is a diagram illustrating an example of time-frequency resources that may be used in a communication system.

FIG. 5 is a diagram illustrating an example of available time-frequency resources as indicated by the empty boxes representing unassigned resource elements. The time-frequency resources may be used in a communication system. The diagram of FIG. 5 illustrates a number of time slots across the time axis and tones across the frequency axis. Each tone in a particular time slot forms a resource element. The resource elements are not preassigned, as indicated by the open time-frequency diagram that does not show any resource elements preassigned, i.e., the patterns for PDCCH, DMRS, PU(D)SCH, and/or PT-RS are not superimposed on the unassigned resource elements. For example, in FIG. 5, none of the resource elements are preassigned as indicated by the empty boxes that do not include any of the patterns indicating an assignment of one of PDCCH, DMRS, PU(D) SCH, and/or PT-RS to that resource element. Accordingly, each resource element is open and may be assigned for use by a PT-RS pilot signal. In comparison, in FIG. 4, resource elements may be preassigned. In FIG. 4, a fixed number of tones are used for PT-RS pilot signals regardless of the bandwidth used for data transmissions. Accordingly, too much or too little bandwidth may be dedicated to PT-RS signal, depending on the data being transmitted. FIG. 5 illustrates an example where the number of resource elements used for PT-RS may vary depending on conditions because each resource element may be open and assigned as needed. (In other aspects, some time-frequency resources may be preassigned and other time-frequency resource open to assignment.)

In systems with a fixed number of PT-RS pilot signals, for large bandwidth UEs, more PT-RS pilot signals than needed may be activated. For smaller bandwidth UEs, the number of PT-RS pilot signals may not be sufficient to establish reliable communications between wireless communication devices. That is, the system with a fixed number of PT-RS pilot signals may not be dependent on the channel condition, particularly a frequency selective channel. The predefined PT-RS pilot signal time-frequency locations (e.g., FIG. 3) may have a weak channel condition, such as low SNR or strong interference. Accordingly, in an aspect, signaling methods may be used to select PT-RS pilot signal frequency domain patterns (e.g., time-frequency locations for PT-RS pilot signals) based on channel condition and scheduled bandwidth.

In an aspect, a first device (UE or gNB) may select the device's preferred frequency domain pattern(s). The frequency domain pattern(s) may include the number of PT-RS pilot signals, the tone locations, and the port mapping, i.e., which of the spatial streams or layers the PT-RS pilot will be inserted. The frequency domain pattern(s) may also indicate the recommended pattern(s), and/or the priority of such patterns to a second device (e.g., gNB or UE). (When the first device is a gNB, the second device may be a UE. The converse may also be true.)

In some aspects, the recommendation for frequency patterns may be made based on MCS, channel conditions, e.g., SNR, interference at each subband, PN property (of each port), scheduled bandwidth, port/layer mapping, scheduling of resources for other UEs, whether CFO/Doppler shift are also present and/or other indicators of channel conditions. A PN property may include, for example, the power and frequency response as defined in frequency domain, power spectrum density, or a PN mask. Port/layer mapping may be defined as which of the spatial streams/layers the PT-RS pilot signals will be mapped into.

For example, the number of PT-RS pilot signals may be chosen based on MCS and scheduled frequency bands. The PT-RS pilot signal location may also be chosen based on channel conditions. For example, the PT-RS pilot signal locations may be selected to be the tones/resource blocks (RBs) with best channel conditions (e.g., highest SINR, or other measures of channel conditions or combinations of such measures). Such selections may be transmitted from the UE to the gNB using, for example, a CSI-RS report and/or from gNB to UE using DCI.

Upon receiving the selections, the receiving device (gNB or UE, depending on which device makes the selection UE or gNB) may send an acknowledgement signaling to inform which recommended pattern will be used or to choose an alternative frequency pattern for PT-RS transmission, and inform the other device (gNB or UE) of the alternative frequency pattern for PT-RS transmission.

The decision whether or not to follow the recommendations may made based on MCS, channel conditions, e.g., SNR, interference at each subband, PN property (of each port), scheduled bandwidth, port/layer mapping, scheduling of other UEs, whether CFO/Doppler shift are also present and/or other indicators of the channels. Examples of reasons not to follow the recommendations include, but are not limited to a UE's recommendation may conflict with resource scheduling of other UEs by a base station, e.g., the preferred ports of the recommendation are not available, and/or the UE's recommended number of ports is smaller (or larger) than what is required for successful communications. For example, in some cases, two ports may be from different Transmit-receive point(TRPs), and may need PT-RS pilot signals in each port while the recommendation by a UE only suggests PT-RS patterns in one of the ports.

When choosing not to use the recommended patterns, the alternative pattern may also be selected based on the aforementioned aspects including MCS, channel conditions, e.g., including SNR and interference at each subband, PN property (of each port), scheduled bandwidth, port/layer mapping, scheduling of other UEs, whether CFO/Doppler shift are also present and/or other indicators of channel conditions.

When a receiving device informs of the alternative pattern, e.g., from UE to eNB or from eNB to UE depending on the device making the initial selection, information of the difference of the alternative pattern from the recommended pattern(s) may be sufficient in some aspects. The acknowledge signaling/alternative pattern indication may be sent in DCI from gNB toUE. The acknowledge signaling/alternative pattern indication may also be sent in a front loaded control symbol (e.g., a DCI in a PDCCH) of a data slot that contains the PT-RS pilot signal time-frequency resources. The acknowledge signaling/alternative pattern indication may by CSI-RS report from UE to gNB. In an example, the signaling may use a CSI-RS to report from UE to base station (gNB), e.g., through a PUCCH.

In an aspect, a device (gNB/UE) may transmit the PT-RS using the specified pattern.

In another aspect, a device may send a request for a recommendation of PT-RS pilot signal time-frequency resources to be used. The request may result in a recommendation of PT-RS pilot signal time-frequency resources to be used being provided to the device making the request.

A first device (gNB/UE) may send a request to a second device (UE/gNB, respectively) to ask for recommendations of frequency patterns, and/or to request to send certain information that the gNB/UE may need to select the frequency domain pattern. The information may include, but is not limited to subband channel state (SNR and interference), PN information at the UE/gNB (e.g. PN mask, how the PN correlates at different ports) and other information to select a frequency pattern for the PT-RS. Such request from a gNB to UE may be sent by CSI-RS/signaling to setup CSI-RS. The UE's PN information may be sent to the base station (e.g., gNB). For example, the UE's PN information may be requested by the base station using radio resource control (RRC) signaling.

Base on the type of request, a device (UE/gNB) may send the requested information and/or selected PT-RS frequency domain patterns. For example, he UE's PN information may be requested and exchanged in a capability exchange period following a random access channel (RACH) procedure.

A device may send an indication of recommended patterns and/or the respective priority of each of the recommended patterns to the device (gNB/UE).

When the request is received by a second device and the recommended patterns are indicated in the signaling, the second device (gNB/UE) may send acknowledgement signaling to inform the UE/GNB, respectively, which recommended pattern will be used. Alternatively, the second device may choose an alternative frequency pattern for actual PT-RS transmission when the recommendation will not be followed and inform the second device of the indication of the alternative pattern.

In an aspect, a device (gNB/UE) may select the frequency domain pattern based on requested information and inform the second device (UE/gNB) of the indication of such a pattern.

The second device (UE/gNB) may send the selected PT-RS pilot signal time-frequency resources. In other words, the second device may send the first device information that indicates the selected time-frequency resources for the PT-RS pilot signal(s) that the second device will use.

In another aspect, when the indication of recommended patterns is sent to a device (UE/gNB), the device may only choose the PT-RS pattern from the indicated recommended patterns and may inform the gNB/UE which recommended pattern will be applied or used.

In some aspects, to inform the other device of the PT-RS pilot signal pattern, an index number from a pre-defined pattern dictionary may be sent. The predefined dictionary may be a list of PT-RS patterns (selected PT-RS pilot signal time-frequency resources) and the index number may indicate a particular pattern or a set of patterns to be used. In some examples, sets of patterns may be sent pattern by pattern using the index numbers. In another aspect, a device may send the tone number for each PT-RS pilot signal. For example, the available frequencies for a communication system may be split into tones. Each tone may be assigned a tone number. Accordingly, the tone may be identified using the assigned tone number.

Another aspect may employ a hybrid of the above two approaches. A device may send an index number of a reference pattern of a pre-defined pattern dictionary and indicate the difference between the desired pattern and the reference pattern whose index is sent. That is, time-frequency resources added or subtracted from the reference pattern(s) based on the index number(s) may be sent. For example, each index number may be added, each index number may be subtracted, one or more index numbers may have an associated with a code to indicate an addition or subtraction from a based. For example, in one aspect, a reference pattern may include a number of PT-RS pilot signals. A device implementing the systems and methods described herein may transmit information to modify the reference pattern by adding in or deleting out some number of PT-RS pilot signals from the reference pattern.

In an aspect, tones may be divided into groups, e.g., resource blocks (RB) or subbands, and may send an index number of the groups, e.g. the index of the RB/subband. The index number of the groups may indicate where the PT-RS pilot signal locations are within each group based on a predefined mapping of index numbers to PT-RS pilot signal locations.

In an example method to transmit signaling information from a device (eNB/UE to eNB/UE) to indicate recommended PT-RS frequency domain patterns, and/or pattern priority; and/or selected PT-RS frequency patterns, the recommended or selected pattern selection may be based on aspects including MCS, channel condition including SNR and interference at each subband, PN property (of each port), scheduled bandwidth, port/layer mapping, scheduling of other UEs, whether CFO/Doppler shift are present, and other aspects of the channel, scheduling, or the network.

In an example, indications of the selected frequency domain patterns may be sent with a DCI, or may be sent with the control symbols corresponding to the data slot that contains the PT-RS pilot signal(s).

In an example, an indication of a recommended patterns, and/or a patterns priority may be sent by CSI-RS report from UE to gNB and/or DCI from gNB to UE.

In an example, in order for a device to transmit signaling information from UE/gNB to gNB/UE to acknowledge the acceptance of the recommended frequency domain patterns and/or to indicate which recommended pattern will be applied, a device may send signaling in the DCI from gNB to UE in PDCCH.

In an example, a first device (gNB/UE) may transmit another device's (UE/gNB) request to the first device (gNB/UE) to send a recommended for a frequency domain pattern of PT-RS pilot signals and/or required information for a second device (UE/gNB) to select a frequency domain pattern for the PT-RS pilot signals. The information that may be required may also be indicated using reference signal. For example, information may be conveyed from gNB to UE using CSI-RS, or from UE to gNB using SRS.

Figure 6:
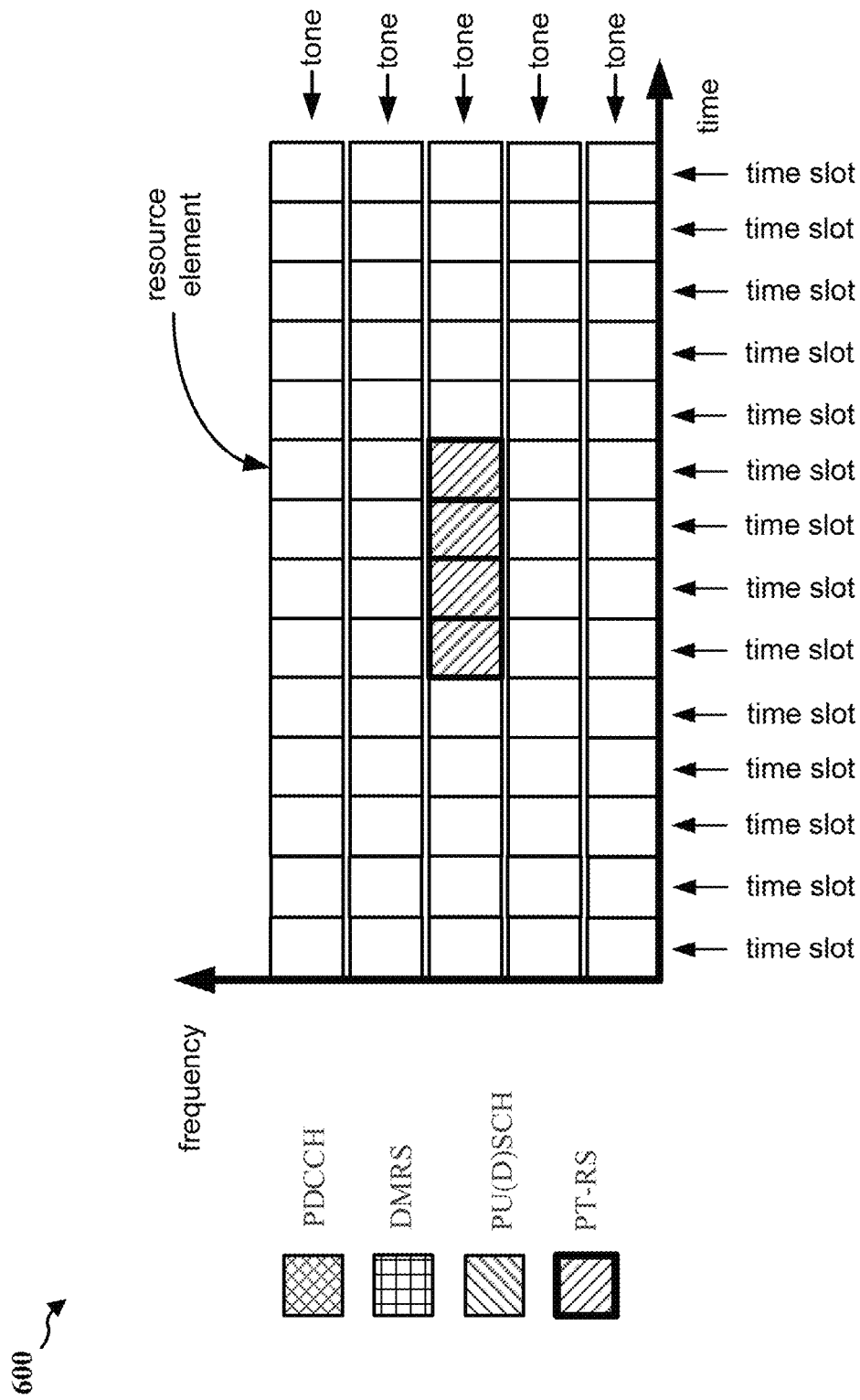
FIG. 6 is a diagram illustrating an example of assignment of channels/signaling to time-frequency resources that may be used in a communication system.

FIG. 6 is a diagram illustrating an example of assignment of channels/signaling to time-frequency resources that may be used in an OFDM communication system. As illustrated, four resource elements are used for PT-RS pilot signals. The selected PT-RS pilot signal time-frequency resources may be based on signal conditions or the other aspects discussed herein. Here one area of time-frequency resources may be selected. More or fewer PT-RS pilot signals may be needed based on the conditions, as described herein. The example illustrated in FIG. 6 includes 4 resource elements for PT-RS pilot signals. The number of PT-RS pilot signals may be increased or decreased as needed based on the operation of the communication system. For example, the number of PT-RS pilot signals may be changed based on changes in the channel conditions. Changes in channel conditions may be indicated using the information sent through the signaling defined herein.

Figure 7:
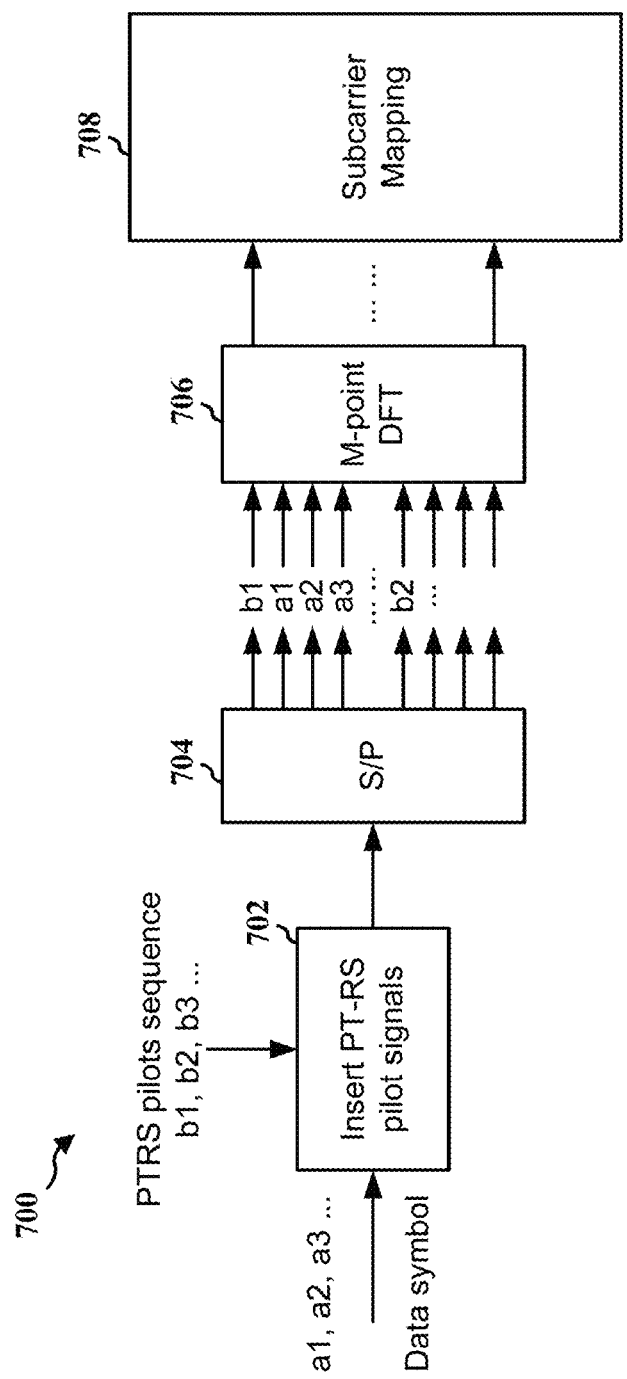
FIG. 7 is a diagram illustrating an example of single carrier FDM (SC-FDM) of assignment of channels/signaling to time-frequency resources that may be used in a communication system.

FIG. 7 is a diagram 700 illustrating an example of SC-FDM, also referred to as Discrete Fourier Transformation-Spread-Orthogonal Frequency Division Multiplexing (DFT-s-OFDM). The diagram 700 includes an insert PT-RS pilot signal block 702, a serial to parallel (S/P) converter block 704, an M-point discrete Fourier Transform DFT block 706, and a subcarrier mapping block 708. The insert PT-RS pilot signal block 702 receives data symbols (a1, a2, a3, ...) and a PT-RS pilot sequence (b1, b2, b3 ...), which are fed serially to the S/P converter block 704. The S/P converter block 704 converters the data symbols (a1, a2, a3, ...) and a PT-RS pilot sequence (b1, b2, b3 ...) from serial to parallel. The parallel data symbols (a1, a2, a3, ...) and a PT-RS pilot sequence (b1, b2, b3 ...) are input to the M-point DFT 706 which performs an M-point DFT on the parallel data symbols (a1, a2, a3, ...) and a PT-RS pilot sequence (b1, b2, b3 ...). The M-point discrete Fourier Transform DFT block 706 outputs the subcarrier mapping module 708. Accordingly, as illustrated in FIG. 7, in an example, PT-RS pilots may be inserted and multiplexed with the data symbol before the DFT operation. The multiplexed data stream may be spread with a DFT matrix and mapped to the input of an IFFT via the subcarrier mapping module 708. The stream may be converted to time domain using an IFFT. In a DFT-s-OFDM system, the selection of time-frequency resource of PT-RS may include selecting how many PT-RS pilots are used, how the PT-RS pilots are inserted, and thus multiplexed with the data symbol and how the subcarrier mapping is performed. For example, in FIG. 7, PT-RS symbols may be distributed over every other 3 data symbols.

Figure 8:
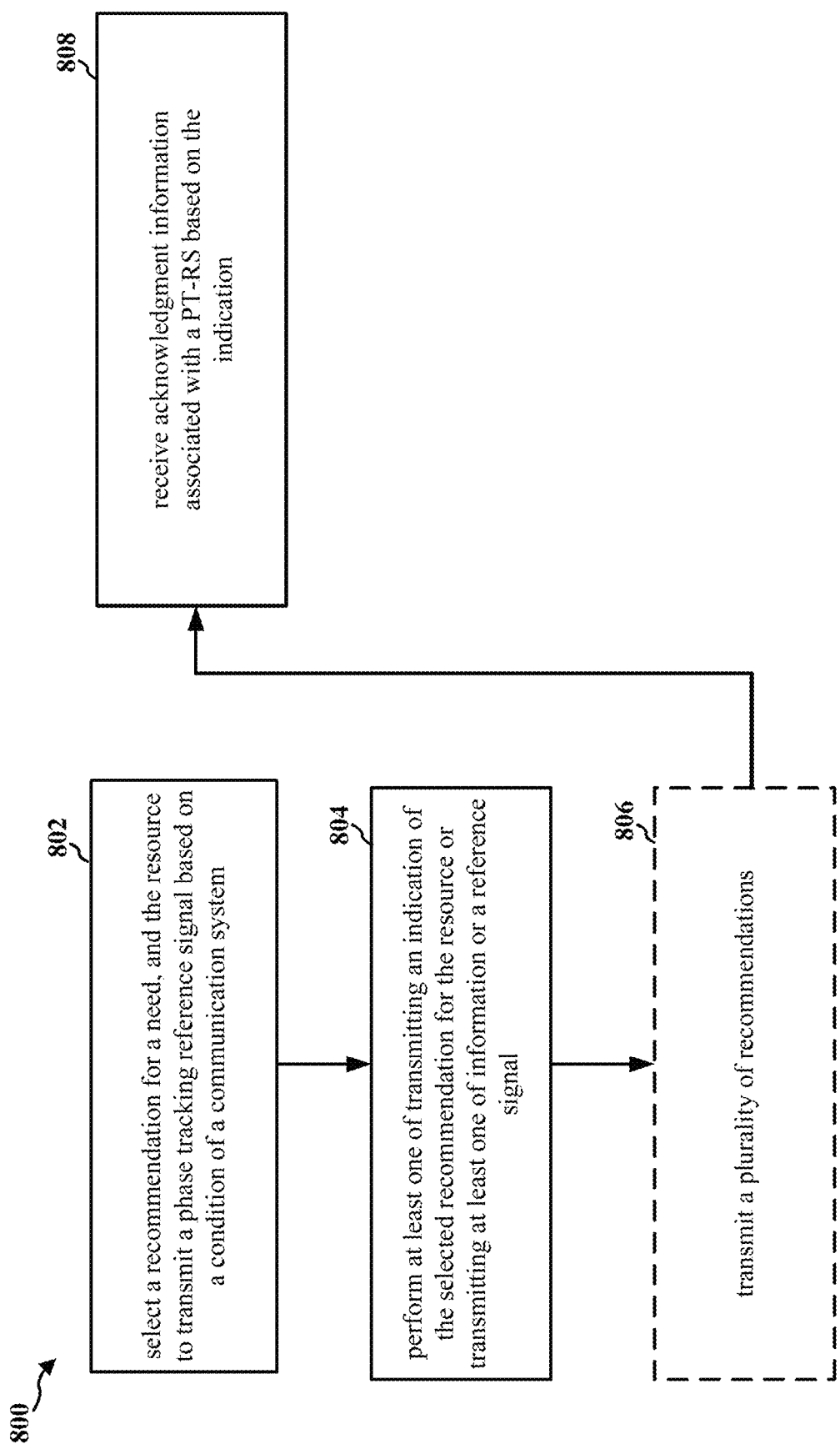
FIG. 8 is a flowchart of a method of wireless communication.

FIG. 8 is a flowchart 800 of a method of wireless communication. The method may be performed by a UE (e.g., the UE 104, 350, the apparatus 902/902'). At 802, the UE selects a recommendation for the resource to transmit a phase tracking reference signal based on a condition of a communication system. For example, the UE (e.g., the UE 104, 350, the apparatus 902/902') selects a recommendation for the resource to transmit a phase tracking reference signal based on a condition of a communication system. In an aspect the selection may be made based on receiving a request for a recommendation from the second wireless communication device or the transmitting the at least one of the information or the reference signal are based on a request received. Accordingly, the UE may select the recommendation for a need, e.g., for the second wireless communication device, by determining the needs of the second wireless communication device, determining one or more resources to provide for the need, and selecting one of the one or more resources to recommend. The UE may select the resource to transmit a phase tracking reference signal based on a condition of a communication system by determining the conditions of the communication system, determining the resources, and selecting one of the resources.

At 804, the UE performs at least one of transmitting an indication of the selected recommendation for the resource to a second wireless communication device or transmitting at least one of information or a reference signal to the second device to assist the second device in determining the resource. For example, the UE (e.g., the UE 104, 350, the apparatus 902/902') performs at least one of transmitting an indication of the selected recommendation for the resource to a second wireless communication device or transmitting at least one of information or a reference signal to the second device to assist the second device in determining the resource. For example, the UE may transmit an indication of the selected recommendation for the resource to a second wireless communication device by determining the indication to be transmitted and providing the indication to a transmission component, e.g., within the UE. The UE may transmit at least one of information or a reference signal to the second device to assist the second device in determining the resource by determining the information or a reference signal and providing the information or a reference signal to a transmission component, e.g., within the UE.

At 806, the UE transmits a plurality of recommendations. For example, the UE (e.g., the UE 104, 350, the apparatus 902/902') transmits a plurality of recommendations. In an aspect, the plurality of recommendations may be transmitted in a priority order. The priority order may be an order of preference for the recommendations. In an aspect, a return transmission may indicate to the UE which of the plurality of recommendations will be followed. For example, the UE may transmits a plurality of recommendations by determining the plurality of recommendations and providing the plurality of recommendations to a transmission device, e.g., within the UE.

At 808, the UE receives acknowledgement information associated with the PT-RS based on the transmitted plurality of recommendations. The acknowledgement information may indicate whether the other device (e.g., the base station) will follow one of the plurality of recommendations. For example, the acknowledgement information may indicate which recommendation of the plurality of recommendations the other device intends to follow. In some aspects, the acknowledgement information may indicate an alternative pattern to be followed for PT-RS transmission. For example, the UE (e.g., the UE 104, 350, the apparatus 902/902') receives acknowledgement information associated with the PT-RS based on the transmitted plurality of recommendations. The acknowledgement information may be received from a base station (e.g., the base station 102, 310) or another apparatus (e.g., the apparatus 1202/1202')

Figure 9:
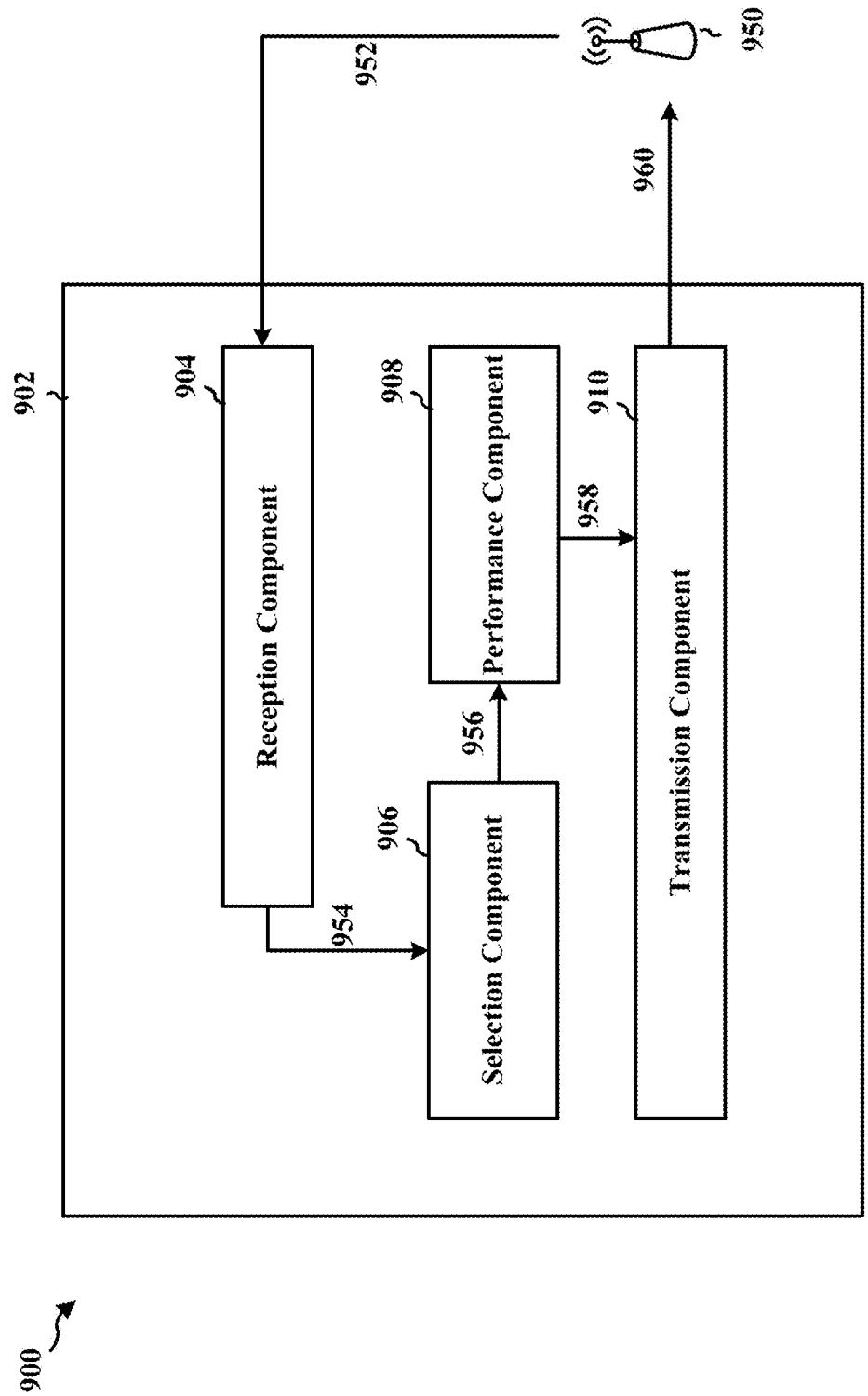
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus includes a reception component 904 that may receive signals 952 from a base station 950 or other wireless devices, a selection component 906 that selects a recommendation for the resource to transmit a phase tracking reference signal based on a condition 954 of a communication system, e.g., based on the received signals 952, a performance component 908 that performs at least one of transmitting an indication of the selected recommendation (based on a received recommendation 956) for the resource to a second wireless communication device or transmitting at least one of information or a reference signal to the second device to assist the second device to determine the resource 958, and a transmission component 910 that transmits signals 960. The signals 960 may include over the air transmissions of one or more of the indication of the selected recommendation the information, or the reference signal, e.g., as received (958) from the performance component 908.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
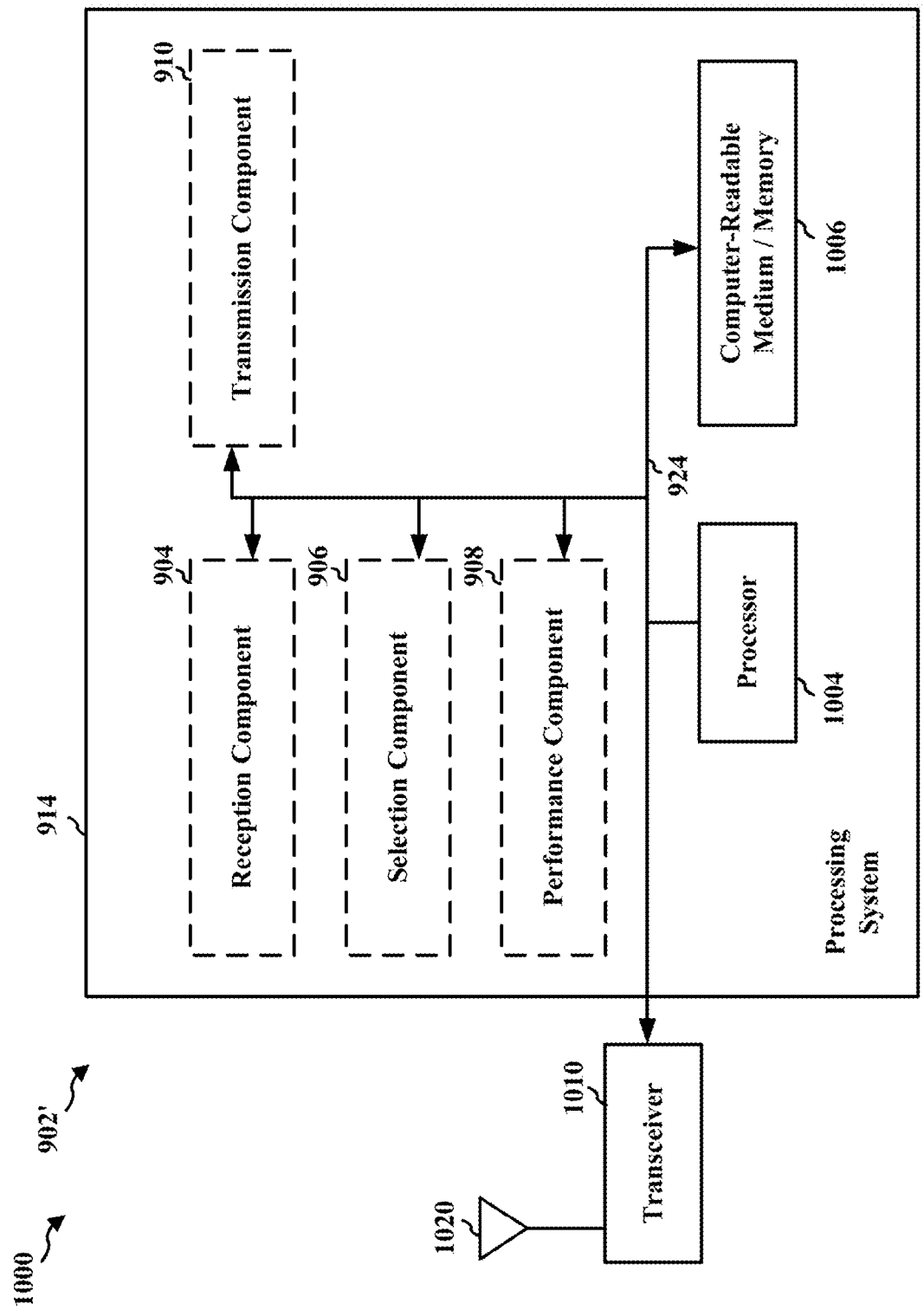
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for selecting a recommendation for a resource to transmit a phase tracking reference signal based on a condition of a communication system, means for performing at least one of transmitting an indication of the selected recommendation for the resource to a second wireless communication device or transmitting at least one of information or a reference signal to the second device to assist the second device in determining the resource, and means for transmitting a plurality of recommendations. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
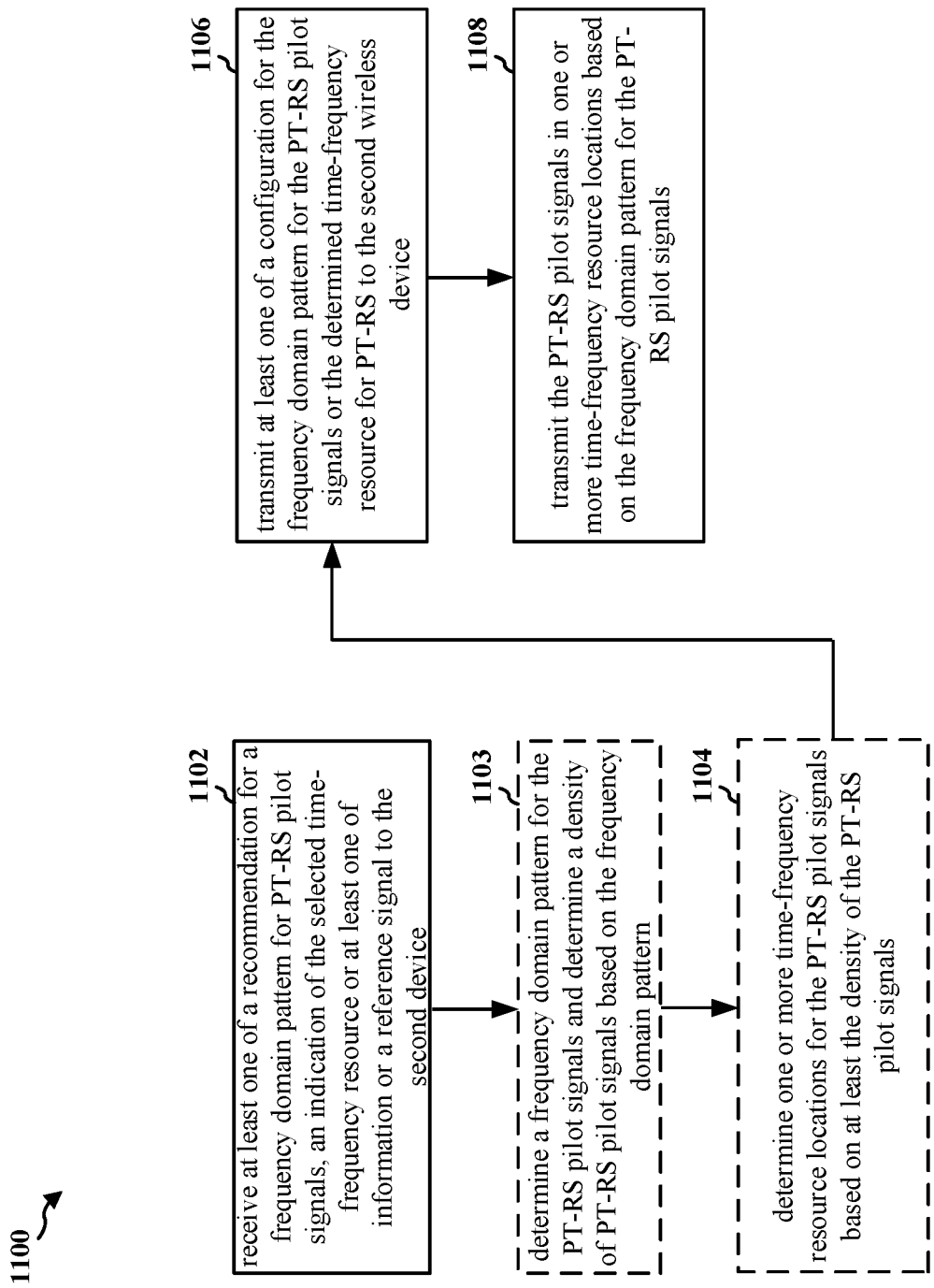
FIG. 11 is a flowchart of a method of wireless communication.

FIG. 11 is a flowchart 1100 of a method of wireless communication. The method may be performed by a gNB (e.g., the gNB 102, 310, the apparatus 1202/1202'). At 1102, the gNb receives at least one of a recommendation for a frequency domain pattern for PT-RS pilot signals, an indication of the selected time-frequency resource from a second wireless communication device or at least one of information or a reference signal to the second device to assist the second device in determining the resource. For example, the gNb (e.g., the gNb 102, 310, the apparatus 1202/1202') receives at least one of an indication of the selected time-frequency resource from a second wireless communication device or at least one of information or a reference signal to the second device to assist the second device in determining the resource. The gNb may receive the at least one of an indication of the selected time-frequency resource from a second wireless communication device or the at least one of information or a reference signal to the second device by tuning to a receive frequency and demodulating signals on the receive frequency. In some aspects, the signaling may indicate individual PT-RS pilot signals to be used or patterns of PT-RS signals to be used. In some aspects, the recommendation for a frequency domain pattern for PT-RS pilot signals may be received from a UE.

[0090.1] At 1103, the gNB may determine a frequency domain pattern for the PT-RS pilot signals and the gNB may determine a density of PT-RS pilot signals based on the frequency domain pattern. For example, the gNb (e.g., the gNb 102, 310, the apparatus 1202/1202') may determine a frequency domain pattern for the PT-RS pilot signals and the gNB may determine a density of PT-RS pilot signals based on the frequency domain pattern. The gNb may determine the frequency domain pattern for the PT-RS pilot signals either based on the at least one recommendation or not based on the at least one recommendation. In some aspects, the frequency density of the PT-RS pilot signals is based on the frequency domain pattern. In some aspects, the frequency domain pattern is more sparse when a larger bandwidth is scheduled for a UE than when a smaller bandwidth is scheduled for the UE.

At 1104, the gNb determines one or more time-frequency resource locations for the PT-RS pilot signals based on at least the density of the PT-RS pilot signals. For example, the gNb (e.g., the gNb 102, 310, the apparatus 1202/1202') determines one or more time-frequency resource locations for the PT-RS pilot signals based on at least the density of the PT-RS pilot signals. For example, the gNb may determine the time-frequency resource by determining a number of available time-frequency resources and selecting a time-frequency resource from the available time-frequency resources. The determination may be made based on at least one of the received indication or the at least one of the information or the reference signal. The determination may be made by the gNb based on the conditions in addition to the at least one of the received indication or the at least one of the information or the reference signal.

At 1106, the gNb may transmit at least one of a configuration for the frequency domain pattern for the PT-RS pilot signals or the determined time-frequency resource for PT-RS to the second wireless device. For example, the gNb (e.g., the gNb 104, 310, the apparatus 1202/1202') may transmit the determined time-frequency resource for PT-RS to the second wireless device. In one aspect, the gNB may send a confirmation of using the selected time-frequency resources in 1102 to the second device. In another aspect, the gNb may send a different frequency domain pattern from the selected time-frequency resources in 1102. In another aspect, the configuration for the frequency domain pattern for the PT-RS pilot signals may be either based on the at least one recommendation or not based on the at least one recommendation.

[0092.1] At 1108, the gNB may transmit the PT-RS pilot signals in one or more time-frequency resource locations based on the frequency domain pattern for the PT-RS pilot signals. For example, the gNb (e.g., the gNb 104, 310, the apparatus 1202/1202') may transmit (e.g., via a transceiver) PT-RS pilot signals in one or more time-frequency resource locations to a UE based on the frequency domain pattern for the PT-RS pilot signals.

Figure 12:
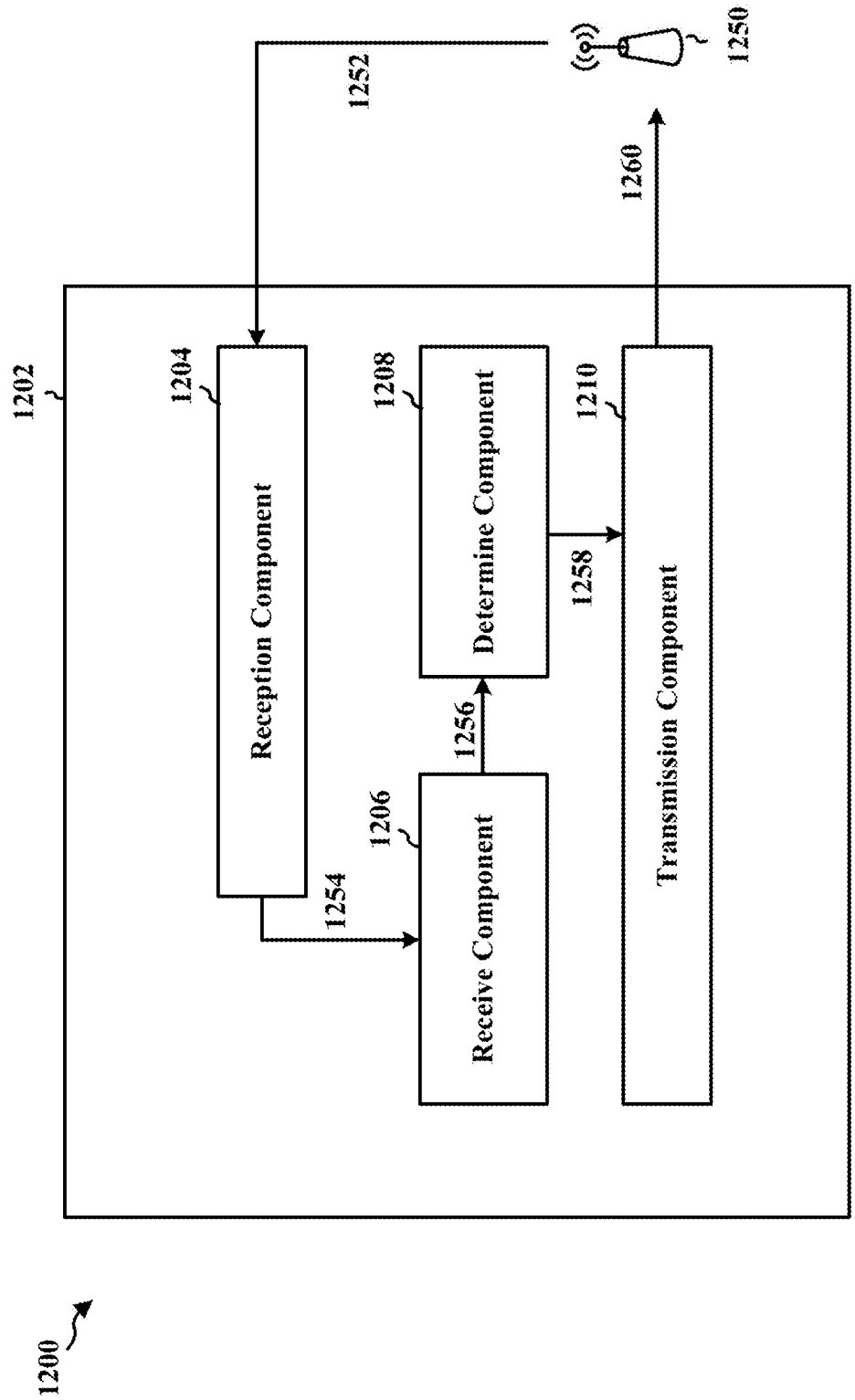
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204 that receives signals 1252 from a base station 1250 or other wireless devices, a receive component 1206 that receives and processes the signals 1254 from the reception component 1204, a determination component 1208 that makes determinations 1258 based on signals 1256 from the receive component 1206, and a transmission component 1208 that transmits signals 1260 based on determinations 1258 from the determination component 1208.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
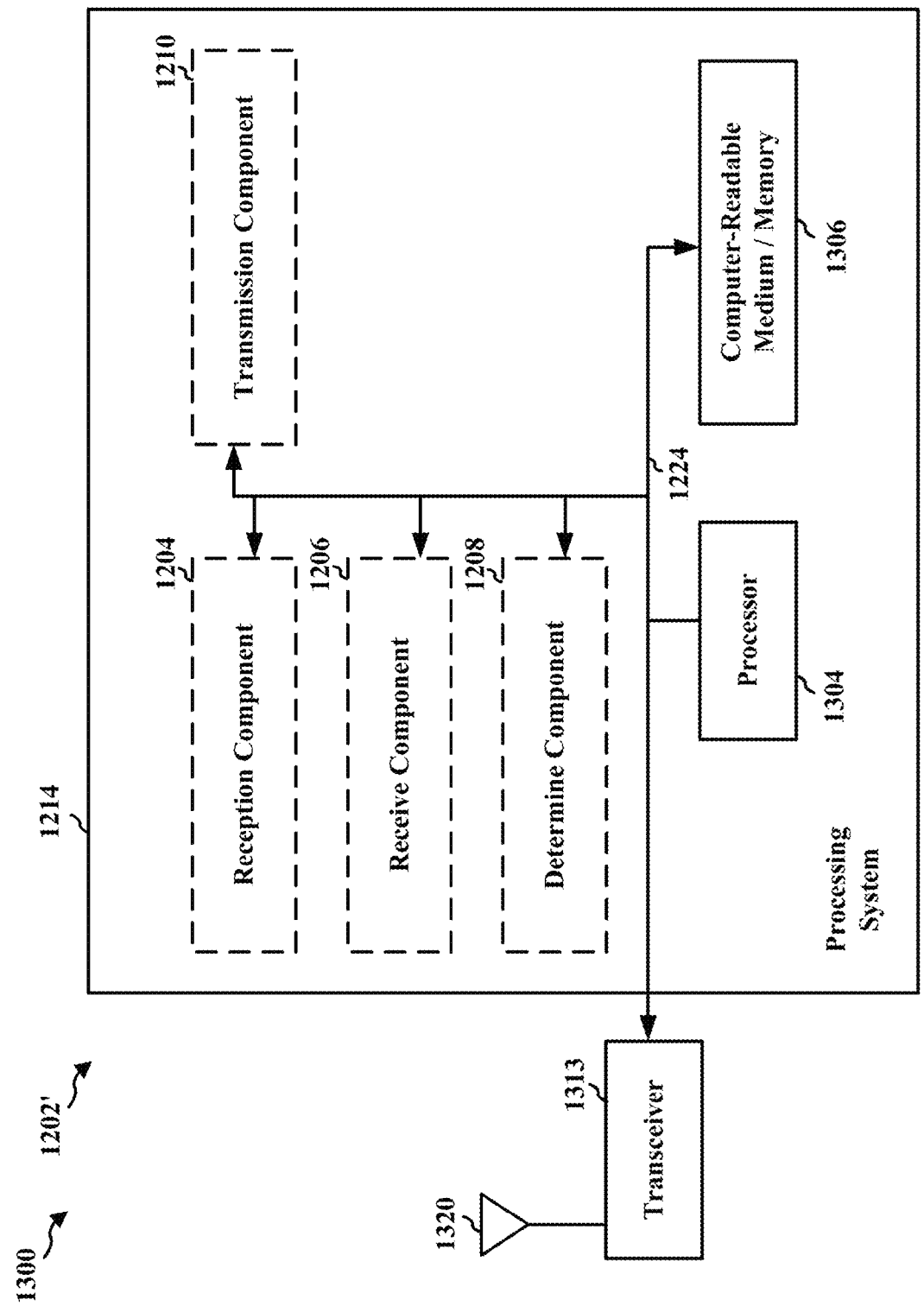
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving at least one of a recommendation of an indication of the selected time-frequency resource from a second wireless communication device or receive at least one of information or a reference signal from the second device to assist the second device in determining the resource, means for determining a time-frequency resource, e.g., based on the received at least one of an indication of the selected time-frequency resource or the received at least one of information or a reference signal, and means for receiving a plurality of recommendations.

In an aspect, an apparatus for wireless communication may include a memory and at least one processor coupled to the memory. The at least one processor may be configured to receive at least one of recommendation of an indication of a selected time-frequency resource from a second wireless communication device or receive at least one of information or a reference signal from the second device to assist the second device in determining the resource and determine a time-frequency resource based on the received at least one of an indication of the selected time-frequency resource or the received at least one of information or a reference signal. The condition may include at least one of scheduled bandwidth, MCS, channel frequency response, SNR, interference, PN property, port mapping. In an aspect, the condition may be known at the first wireless communication device. In an aspect, the condition may be received at the first wireless communication device from the second wireless communication device. In an aspect, the condition is based on a reference signal received from the second communication device.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a transceiver of a base station;
an antenna coupled to the transceiver;
a memory; and
at least one processor coupled to the memory and configured to control the transceiver, the at least one processor further configured to:
receive, from a user equipment (UE), via the transceiver, at least one recommendation for a frequency domain pattern for phase tracking reference signal (PT-RS) pilot signals;
transmit, to the UE, via the transceiver, a configuration for the frequency domain pattern for the PT-RS pilot signals, the configuration for the frequency domain pattern for the PT-RS pilot signals being either based on the at least one recommendation or not based on the at least one recommendation; and
transmit, to the UE, via the transceiver, the PT-RS pilot signals in one or more time-frequency resource locations based on the frequency domain pattern for the PT-RS pilot signals.

2. The apparatus of claim 1, wherein the at least one processor further configured to:
determine a density of the PT-RS pilot signals based on the frequency domain pattern; and
determine the one or more time-frequency resource locations for the PT-RS pilot signals based on at least the density of the PT-RS pilot signals.

3. The apparatus of claim 2, wherein the density of the PT-RS pilot signals is associated with a number of PT-RS tones, locations of PT-RS tones, or both.

4. The apparatus of claim 1, wherein the at least one recommendation for the frequency domain pattern for the PT-RS pilot signals comprises modulation and coding scheme (MCS) information.

5. The apparatus of claim 1, wherein the at least one recommendation for the frequency domain pattern for the PT-RS pilot signals comprises capability information of the UE.

6. The apparatus of claim 1, wherein the at least one processor further configured to:
determine the frequency domain pattern for the PT-RS pilot signals either based on the at least one recommendation or not based on the at least one recommendation.

7. The apparatus of claim 6, wherein a frequency density of the transmitted PT-RS pilot signals is based on the frequency domain pattern.

8. The apparatus of claim 7, wherein the frequency domain pattern is more sparse when a larger bandwidth is scheduled for the UE than when a smaller bandwidth is scheduled for the UE.

9. The apparatus of claim 1, wherein the one or more time-frequency resource locations in which the PT-RS pilot signals are transmitted are further based on at least one of a bandwidth scheduled for the UE, a modulation and coding scheme (MCS), a port mapping, or any combination thereof.

10. A method for wireless communication by a base station, comprising:
receiving, from a user equipment (UE), at least one recommendation for a frequency domain pattern for phase tracking reference signal (PT-RS) pilot signals;
transmitting, to the UE, a configuration for the frequency domain pattern for the PT-RS pilot signals, the configuration for the frequency domain pattern for the PT-RS pilot signals being either based on the at least one recommendation or not based on the at least one recommendation; and
transmitting, to the UE, the PT-RS pilot signals in one or more time-frequency resource locations based on the frequency domain pattern for the PT-RS pilot signals.

11. The method of claim 10, further comprising:
determining a density of the PT-RS pilot signals based on the frequency domain pattern; and
determining the one or more time-frequency resource locations for the PT-RS pilot signals based on at least the density of the PT-RS pilot signals.

12. The method of claim 11, wherein the density of the PT-RS pilot signals is associated with a number of PT-RS tones, locations of PT-RS tones, or both.

13. The method of claim 10, wherein the at least one recommendation for the frequency domain pattern for the PT-RS pilot signals comprises modulation and coding scheme (MCS) information.

14. The method of claim 10, wherein the at least one recommendation for the frequency domain pattern for the PT-RS pilot signals comprises capability information of the UE.

15. The method of claim 10, further comprising:
determining the frequency domain pattern for the PT-RS pilot signals either based on the at least one recommendation or not based on the at least one recommendation.

16. The method of claim 15, wherein a frequency density of the transmitted PT-RS pilot signals is based on the frequency domain pattern.

17. The method of claim 16, wherein the frequency domain pattern is more sparse when a larger bandwidth is scheduled for the UE than when a smaller bandwidth is scheduled for the UE.

18. The method of claim 10, wherein the one or more time-frequency resource locations in which the PT-RS pilot signals are transmitted are further based on at least one of a bandwidth scheduled for the UE, a modulation and coding scheme (MCS), a port mapping, or any combination thereof.

19. An apparatus for wireless communication by a first wireless communication device, comprising:
means for receiving, from a user equipment (UE), a recommendation for a frequency domain pattern for phase tracking reference signal (PT-RS) pilot signals;
means for transmitting, to the UE, a configuration for the frequency domain pattern for the PT-RS pilot signals, the configuration for the frequency domain pattern for the PT-RS pilot signals being either based on the at least one recommendation or not based on the at least one recommendation; and
means for transmitting, to the UE, the PT-RS pilot signals in one or more time-frequency resource locations based on the frequency domain pattern for the PT-RS pilot signals.

20. The apparatus of claim 19, further comprising:
means for determining a density of the PT-RS pilot signals based on the frequency domain pattern; and
means for determining the one or more time-frequency resource locations for the PT-RS pilot signals based on at least the density of the PT-RS pilot signals.

21. The apparatus of claim 20, wherein the density of the PT-RS pilot signals is associated with a number of PT-RS tones, locations of PT-RS tones, or both.

22. The apparatus of claim 19, wherein the at least one recommendation for the frequency domain pattern for the PT-RS pilot signals comprises modulation and coding scheme (MCS) information.

23. The apparatus of claim 19, wherein the at least one recommendation for the frequency domain pattern for the PT-RS pilot signals comprises capability information of the UE.

24. The apparatus of claim 19, further comprising:
means for determining the frequency domain pattern for the PT-RS pilot signals either based on the at least one recommendation or not based on the at least one recommendation.

25. The apparatus of claim 24, wherein a frequency density of the transmitted PT-RS pilot signals is based on the frequency domain pattern.

26. The apparatus of claim 25, wherein the frequency domain pattern is more sparse when a larger bandwidth is scheduled for the UE than when a smaller bandwidth is scheduled for the UE.

27. The apparatus of claim 19, wherein the one or more time-frequency resource locations in which the PT-RS pilot signals are transmitted are further based on at least one of a bandwidth scheduled for the UE, a modulation and coding scheme (MCS), a port mapping, or any combination thereof.

28. A non-transitory, computer-readable medium storing one or more instructions for wireless communication that, when executed by one or more processors of a first wireless communication device, instruct the one or more processors to:
receive, from a user equipment (UE), at least one recommendation for a frequency domain pattern for phase tracking reference signal (PT-RS) pilot signals;
transmit, to the UE, a configuration for the frequency domain pattern for the PT-RS pilot signals, the configuration for the frequency domain pattern for the PT-RS pilot signals being either based on the at least one recommendation or not based on the at least one recommendation; and transmit, to the UE, the PT-RS pilot signals in one or more time-frequency resource locations based on the frequency domain pattern for the PT-RS pilot signals.

29. The computer-readable medium of claim 28, further comprising instructions that, when executed by the one or more processors, instruct the one or more processors to:
determine a density of the PT-RS pilot signals based on the frequency domain pattern; and
determine the one or more time-frequency resource locations for the PT-RS pilot signals based on at least the density of the PT-RS pilot signals.

30. The computer-readable medium of claim 29, wherein the density of the PT-RS pilot signals is associated with a number of PT-RS tones, locations of PT-RS tones, or both.

31. The computer-readable medium of claim 28, wherein the at least one recommendation for the frequency domain pattern for the PT-RS pilot signals comprises modulation and coding scheme (MCS) information.

32. The computer-readable medium of claim 28, wherein the at least one recommendation for the frequency domain pattern for the PT-RS pilot signals comprises capability information of the UE.

33. The computer-readable medium of claim 28, further comprising instructions for wireless communication that, when executed by one or more processors of a first wireless communication device, instruct the one or more processors to:
determine the frequency domain pattern for the PT-RS pilot signals either based on the at least one recommendation or not based on the at least one recommendation.

34. The computer-readable medium of claim 33, wherein a frequency density of the transmitted PT-RS pilot signals is based on the frequency domain pattern.

35. The computer-readable medium of claim 34, wherein the frequency domain pattern is more sparse when a larger bandwidth is scheduled for the UE than when a smaller bandwidth is scheduled for the UE.

36. The computer-readable medium of claim 28, wherein the one or more time-frequency resource locations in which the PT-RS pilot signals are transmitted are further based on at least one of a bandwidth scheduled for the UE, a modulation and coding scheme (MCS), a port mapping, or any combination thereof.

* * * * *